United States Patent [19]

Takahashi

[11] Patent Number: 5,179,480
[45] Date of Patent: Jan. 12, 1993

[54] STILL IMAGE REPRODUCING SYSTEM HAVING MEANS FOR CAUSING A MOVEMENT OF THE REPRODUCING HEAD

[75] Inventor: Hirokazu Takahashi, Yokohama, Japan

[73] Assignee: Canon Kabushiki Kaisha, Tokyo, Japan

[21] Appl. No.: 531,641

[22] Filed: Jun. 1, 1990

[30] Foreign Application Priority Data

Jun. 2, 1989 [JP] Japan ................... 1-140744

[51] Int. Cl.$^5$ .................. G11B 5/54; H04N 5/781
[52] U.S. Cl. .................. 360/78.04; 360/10.1; 360/69; 358/909
[58] Field of Search ............... 360/10.1–10.3, 360/13–14.3, 33.1, 35.1, 38.1, 69, 61, 73.05–73.08, 78.04, 8, 46, 67; 358/312, 314, 335, 336, 342, 906, 909

[56] References Cited

U.S. PATENT DOCUMENTS

| | | | |
|---|---|---|---|
| 4,459,620 | 7/1984 | Abe et al. | 358/312 |
| 4,618,899 | 10/1986 | Doutsubo | 360/73.07 |
| 4,710,832 | 12/1987 | Itoh | 360/10.2 |
| 4,769,721 | 9/1988 | Kajiura | 360/10.1 |
| 5,055,938 | 10/1991 | Misumi et al. | 360/33.1 |

Primary Examiner—Jerry Smith
Assistant Examiner—Steven R. Garland
Attorney, Agent, or Firm—Fitzpatrick, Cella, Harper & Scinto

[57] ABSTRACT

A still image reproducing system includes reproducing structure for reproducing still image data recorded on a recording medium. Instructing circuitry is provided for issuing instructions to cause movement of a reproducing position of the reproducing structure. Circuitry is provided for measuring a time interval between the instructions issued by the instructing circuitry. Control circuitry is provided for selecting one of a plurality of operation modes of the reproducing structure according to the time interval measured by the measuring circuitry. The operation modes include a first mode in which still image data reproduced by the reproducing structure is muted, and a second mode in which still image data reproduced by the reproducing structure is not muted.

10 Claims, 13 Drawing Sheets

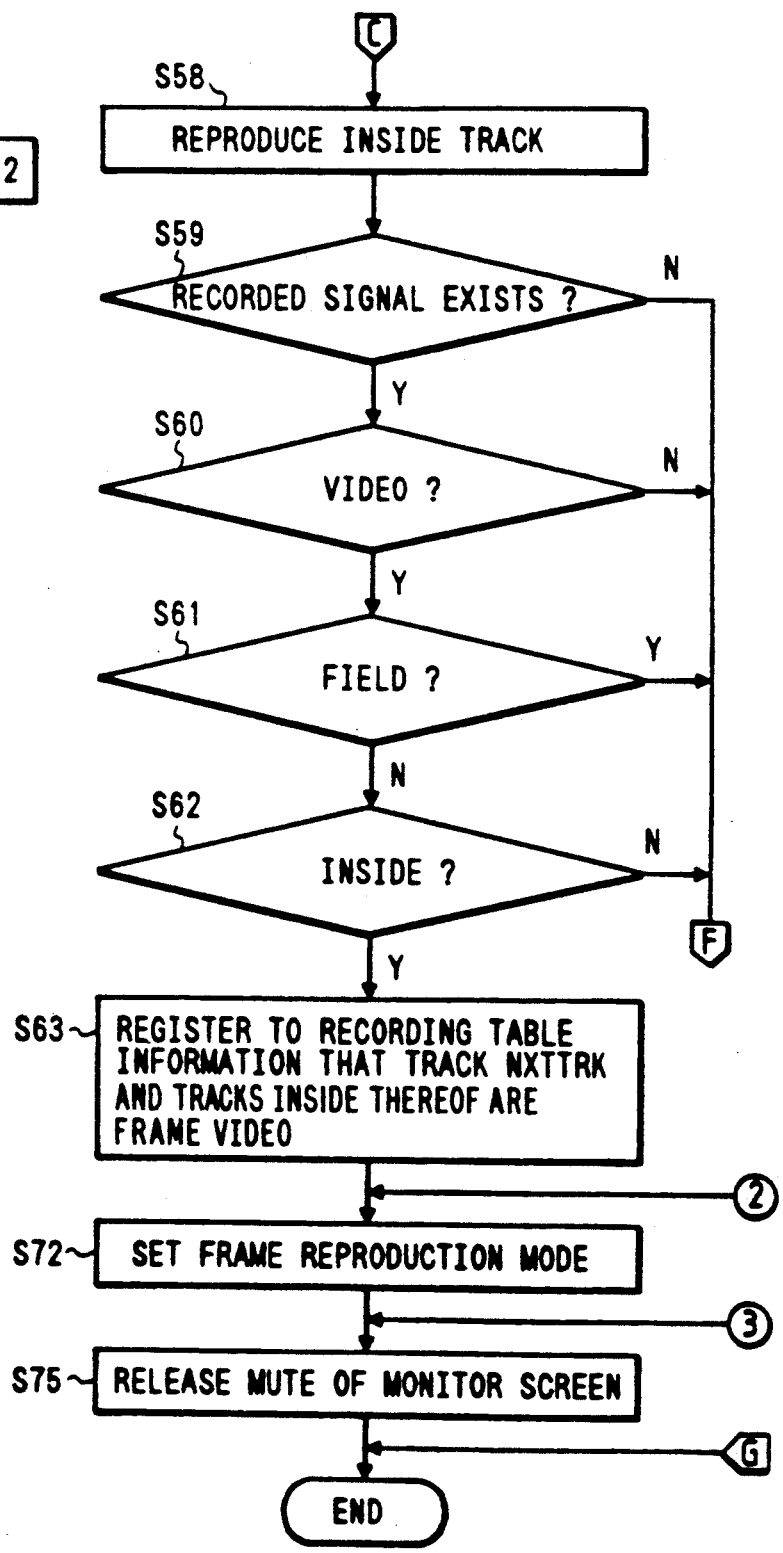

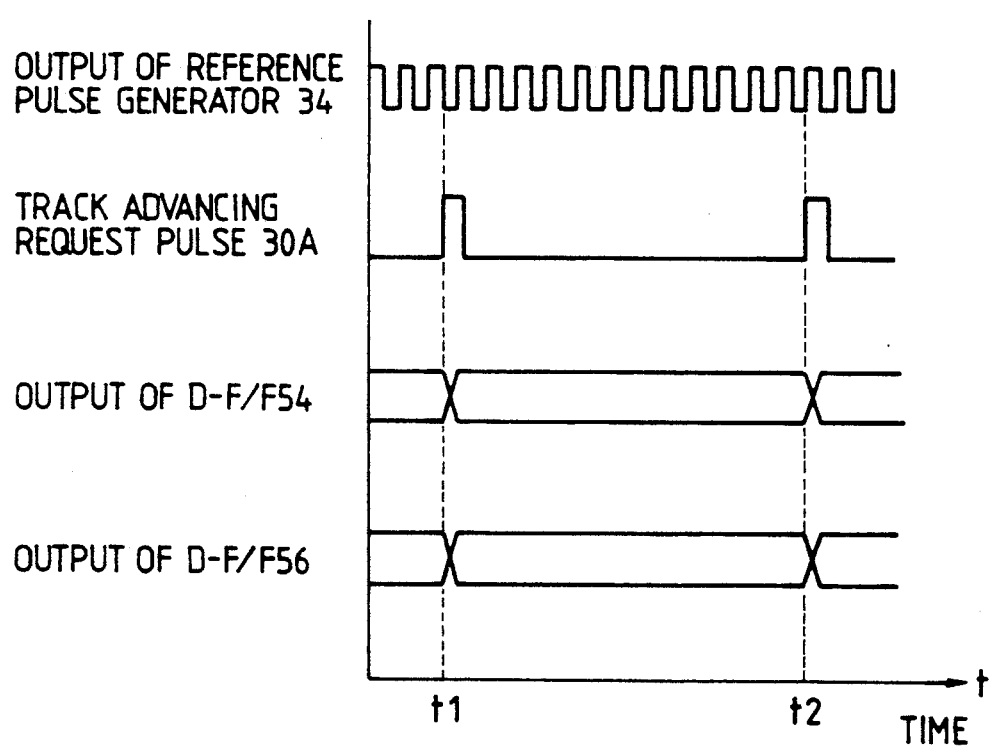

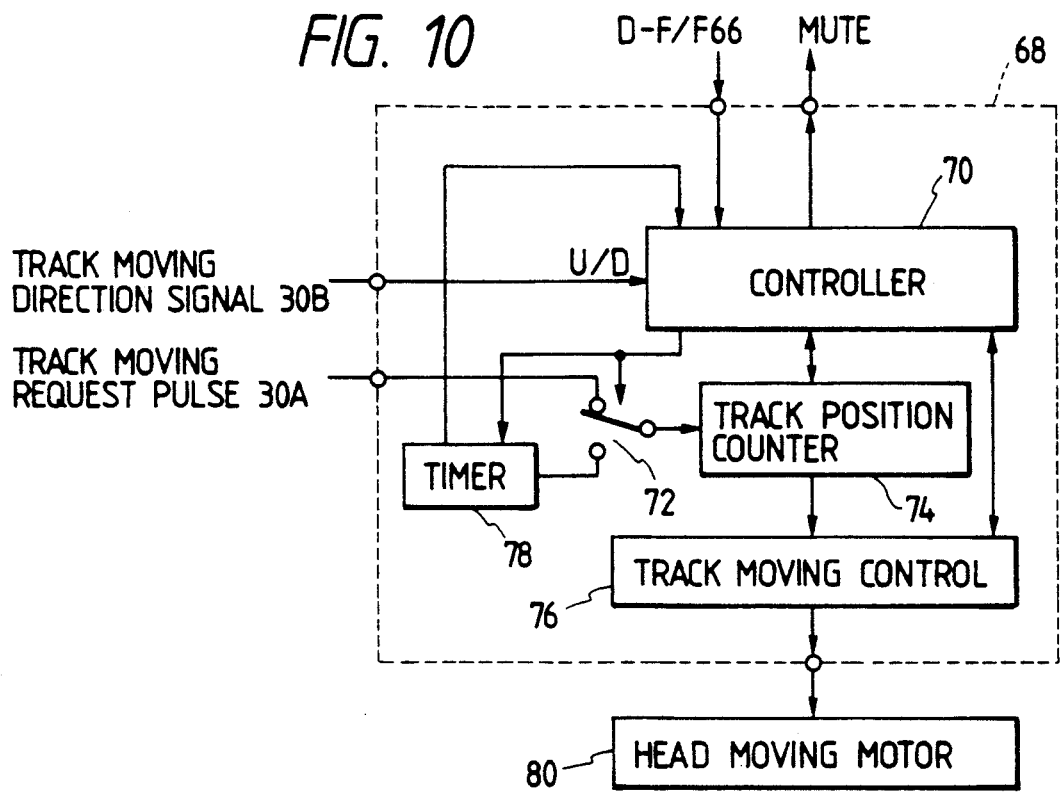
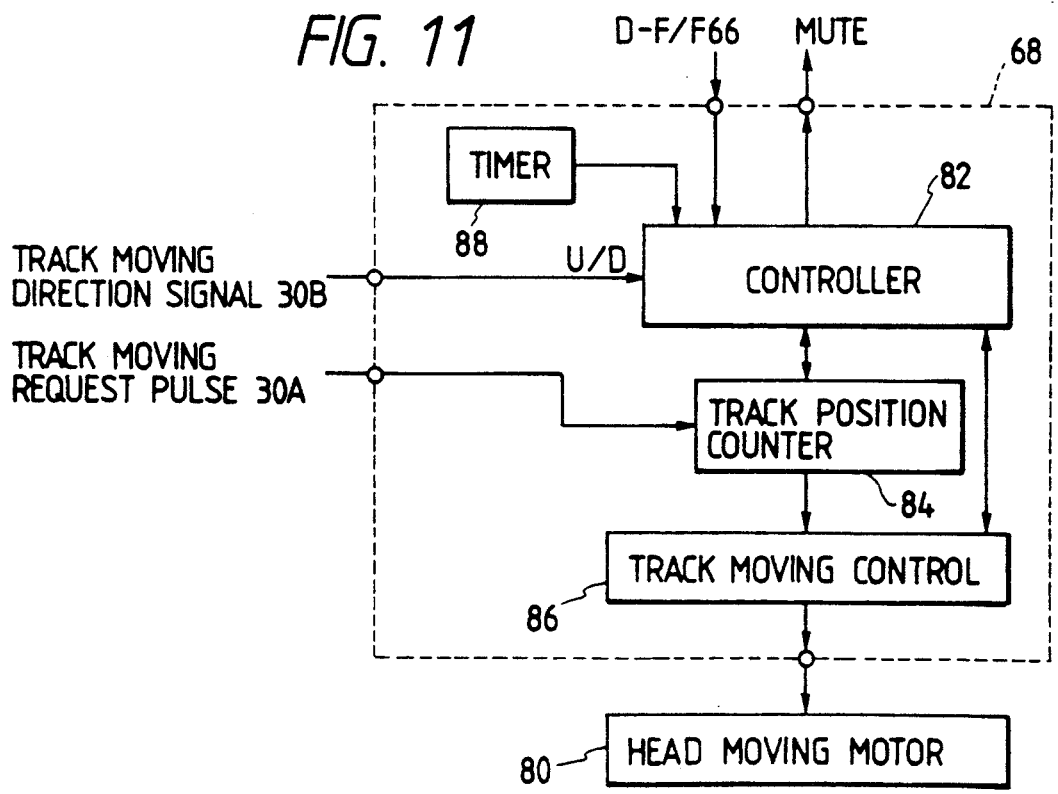

STILL IMAGE REPRODUCING SYSTEM HAVING MEANS FOR CAUSING A MOVEMENT OF THE REPRODUCING HEAD

BACKGROUND OF THE INVENTION

1. Field of the Invention

This invention relates to a still image reproducing system.

2. Related Background Art

In the prior art still image reproducing system, when moving a reproducing head to a different track, the head is moved to the intended track without muting a monitor screen if the intended track is an adjacent track. If the intended track is not an adjacent track, the monitor screen is muted before moving the reproducing head to the intended track, and after the movement, the muting of the monitor screen is released.

In such a system, since the monitor screen is not muted when the reproducing head is moving to an adjacent track, if a signal recorded in the intended track is other than a video signal, a noise-like signal is displayed on the monitor screen after track moving. Further, even if characters are displayed on the monitor screen, a noise-like character display results because no video sync signal can be immediately obtained from the reproduced signal. Of course such an inconvenience does not occur in a case where the character display is performed according to an internal sync signal.

Furthermore, when a video signal is recorded in the intended track, if it is not known that the video signal is of an odd or an even field, a skew is produced on the monitor screen for a period necessary for field adjustment after track moving.

SUMMARY OF THE INVENTION

A primary object of the present invention is to provide a still image reproducing system, which can obviate the problems discussed above.

A second object of the present invention is to provide a system which can prevent the presentation of a disturbed image on the monitor screen.

To attain the above objects of the invention, there is provided a still image reproducing system which comprises track moving request means for initiating the movement of a reproducing head to a desired track position, measuring means for measuring the interval of a request signal provided from the track moving request means, and control means for selectively executing one of a plurality of different operational modes according to the time measured by the measuring means.

With these means, an operation mode is selected according to the speed of the track moving request, or the like. That is, an adequate operation mode corresponding to a new reproduction signal is selected to maintain the monitor screen in as satisfactory a state as possible.

A further object of the invention is to improve the operational control aspects of a system in which a change in the head reproducing position is initiated using a JOG dial.

The above and further objects and features of the invention will become more apparent from the following description of the embodiments with reference to the accompanying drawings.

BRIEF DESCRIPTION OF THE DRAWINGS

FIG. 4 is a timing chart for switching the head-moving modes;

FIG. 10 is a functional block diagram of system controller 68 shown in FIG. 9; and FIG. 11 is a different functional block diagram of system controller 68 shown in FIG. 9.

DETAILED DESCRIPTION OF THE PREFERRED EMBODIMENTS

Now, an embodiment of the present invention will be described with reference to the drawings.

Figure 1:
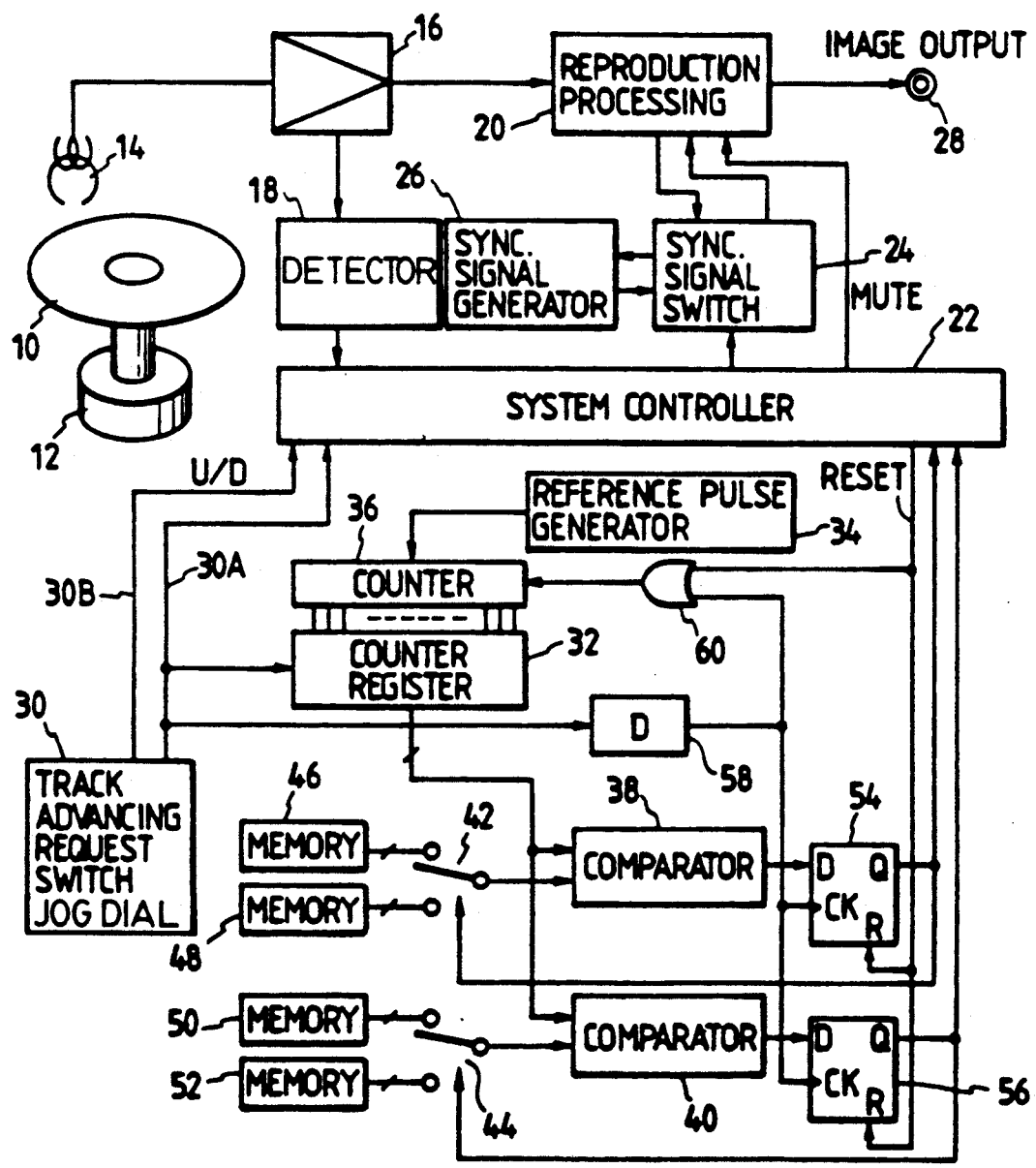
FIG. 1 is a block diagram representation of one embodiment of the invention.

FIG. 1 is a block diagram representation of one embodiment of the invention. Magnetic disk 10 is driven by motor 12 for rotation at a constant speed. Concentric tracks are formed on the disk. A signal reproduced by magnetic head 14 is amplified by reproduction amplifier 16 before it is impressed on detector 18 and reproduction processing circuit 20. Detector 18 outputs an envelope signal of the reproduced signal to system controller 22. System controller 22 detects the level of the envelope signal, and it determines whether the detected level of the recorded signal is lower than or higher than a predetermined level.

Reproduction processing circuit 20 separates the sync signal and couples the same to a sync signal switch 24. Sync signal switch 24 is on-off operated by system controller 22, and it supplies a sync signal (i.e., a reproduction sync signal) separated from the reproduction signal to an external sync terminal (not shown) of sync signal generator 26. When the sync signal appears at the external sync terminal, sync signal generator 26 generates an in-phase sync signal. When no sync signal appears at the external sync terminal, the generator generates a sync signal by itself. The sync signal output from sync signal generator 26 is supplied through sync signal switch 24 to reproduction processing circuit 20. Reproduction processing circuit 20 superimposes the sync signal on the reproduction signal output to image output terminal 28. If a mute signal is impressed on reproduction processing circuit 20 from system controller 22 when superimposing the sync signal on the reproduction signal, reproduction processing circuit 20 outputs just the sync signal to image output terminal 28 without superimposition of the sync signal on the reproduction signal.

Track advancing request switch 30 comprises a push switch, a rotary encoder, or other switches (such as a jog dial), and it provides a one-pulse track moving request pulse signal 30A and a track moving direction signal 30B per pulse. System controller 22 controls track advancing according to output signals 30A and 30B. Track moving request pulse 30A from track advancing request switch 30 is also supplied to counter register 22 for measuring the time interval of the track moving request pulse signal 30A. Reference pulse generator 34 generates reference pulses at a constant interval, and counter 36 up-counts the reference pulses. Counter register 32 latches the count of counter 36 according to the track advancing request pulse 30A, and impresses the latched value on comparators 38 and 40. Comparator 38 compares the latched value to a selected one of the values stored in memories 46 and 48 (as selected by switch 42), and impresses the result on D flip-flop 54. Comparator 40 compares the latched value to a selected one of the values stored in memories 50 and 52 (as selected by switch 44), and impresses the result on D flip-flop 56.

Track moving request pulse 30A is delayed in delay circuit 58 for a predetermined period of time to provide a latch pulse to D flip-flops 54 and 56. Further, it is impressed as a reset pulse through OR gate 60 on counter 36.

When system controller 22 senses the track moving request pulse 30A, it moves magnetic head 14 in a mode corresponding to the outputs of D flip-flops 54 and 56. There are the following three modes of moving magnetic head 14.

Moving Mode I

The monitor screen is muted during the movement of magnetic head 14, and if it is found after the moving operation that a video signal is recorded in the accessed track, the frame/field is automatically determined, and the muting of the monitor screen is released for reproduction. If the accessed track is an unrecorded track or contains a recorded signal other than a video signal, the monitor screen is muted.

Moving Mode II

During the movement of magnetic head 14, a field video reproduction mode is provided, and the monitor screen is not muted. If it is found after moving that a video signal is recorded in the accessed track, the frame/field is automatically determined and the muting of the monitor screen is released for reproduction. If the accessed track is an unrecorded track or contains a recorded signal other than a video signal, the monitor screen is muted.

Moving Mode III

Normally, the muting of the monitor screen is released, and the field video reproduction mode is provided for reproduction irrespective of whether a recorded signal is contained in the accessed track. However, if it is found after the moving operation that the accessed track is an unrecorded track or contains a recorded signal other than a video signal, the monitor screen is muted after the lapse of a predetermined period of time.

Figure 2A:
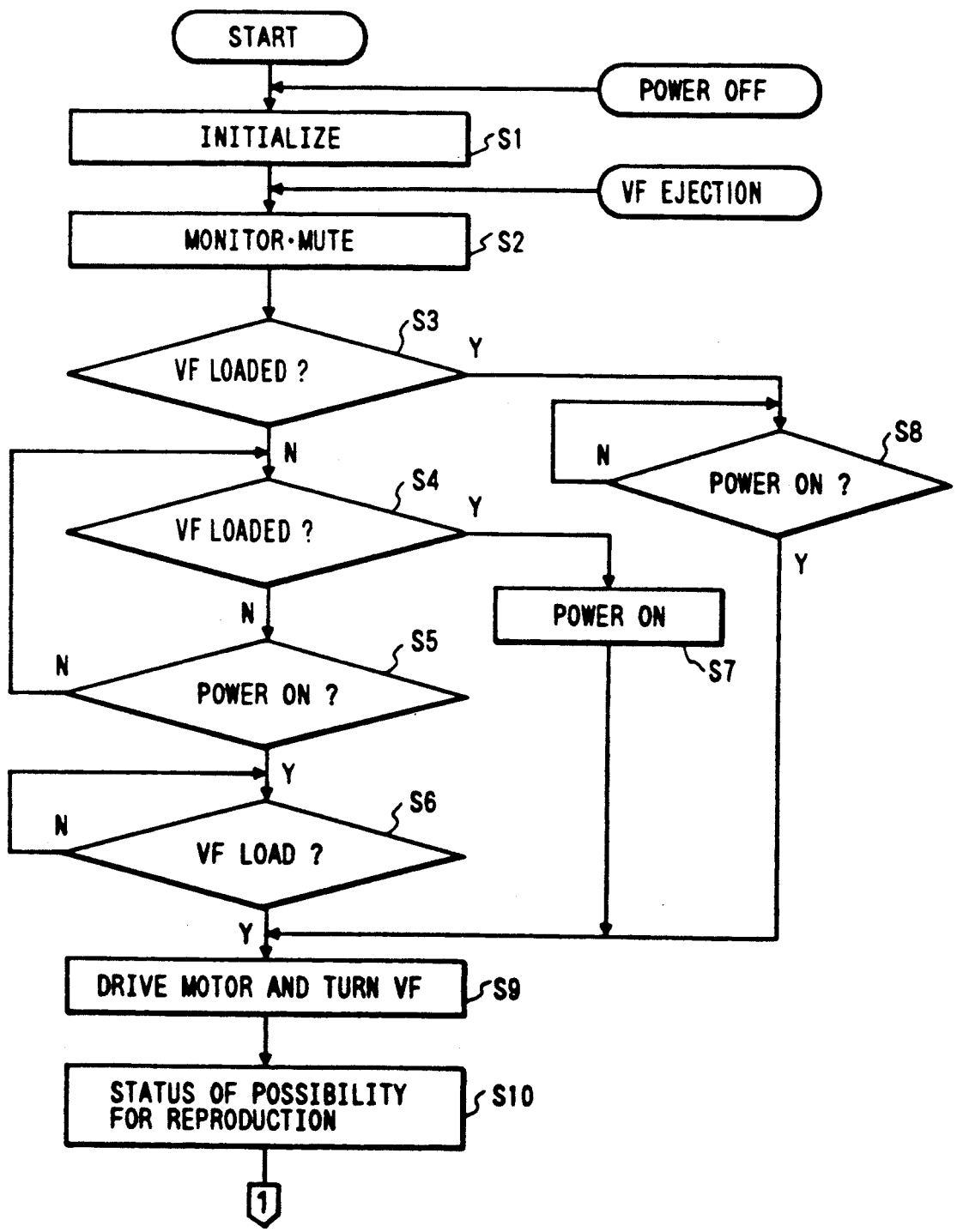
FIGS. 2A and 2B are flow charts illustrating the basic operation of system controller 22 shown in FIG. 1.
Figure 2B:
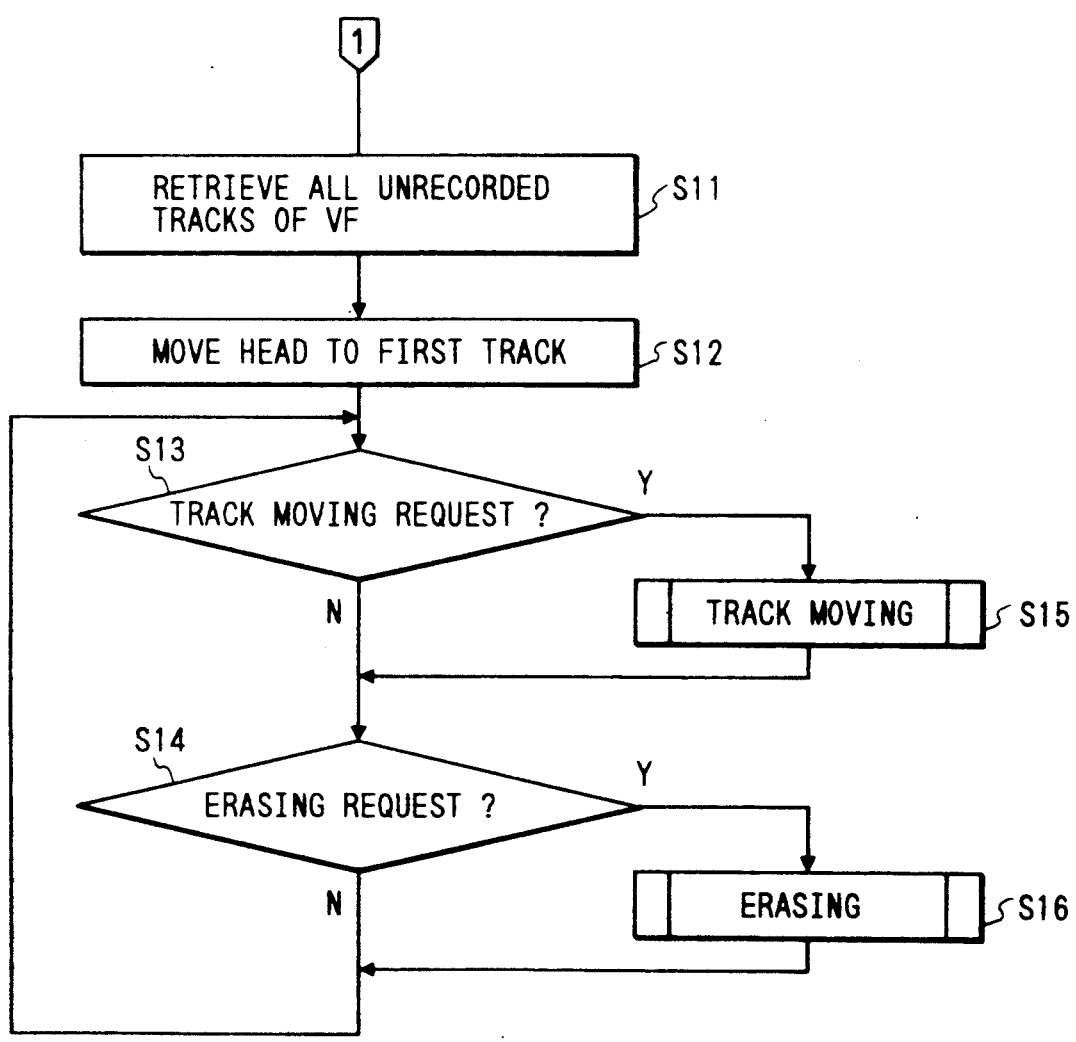
Figure 3A:
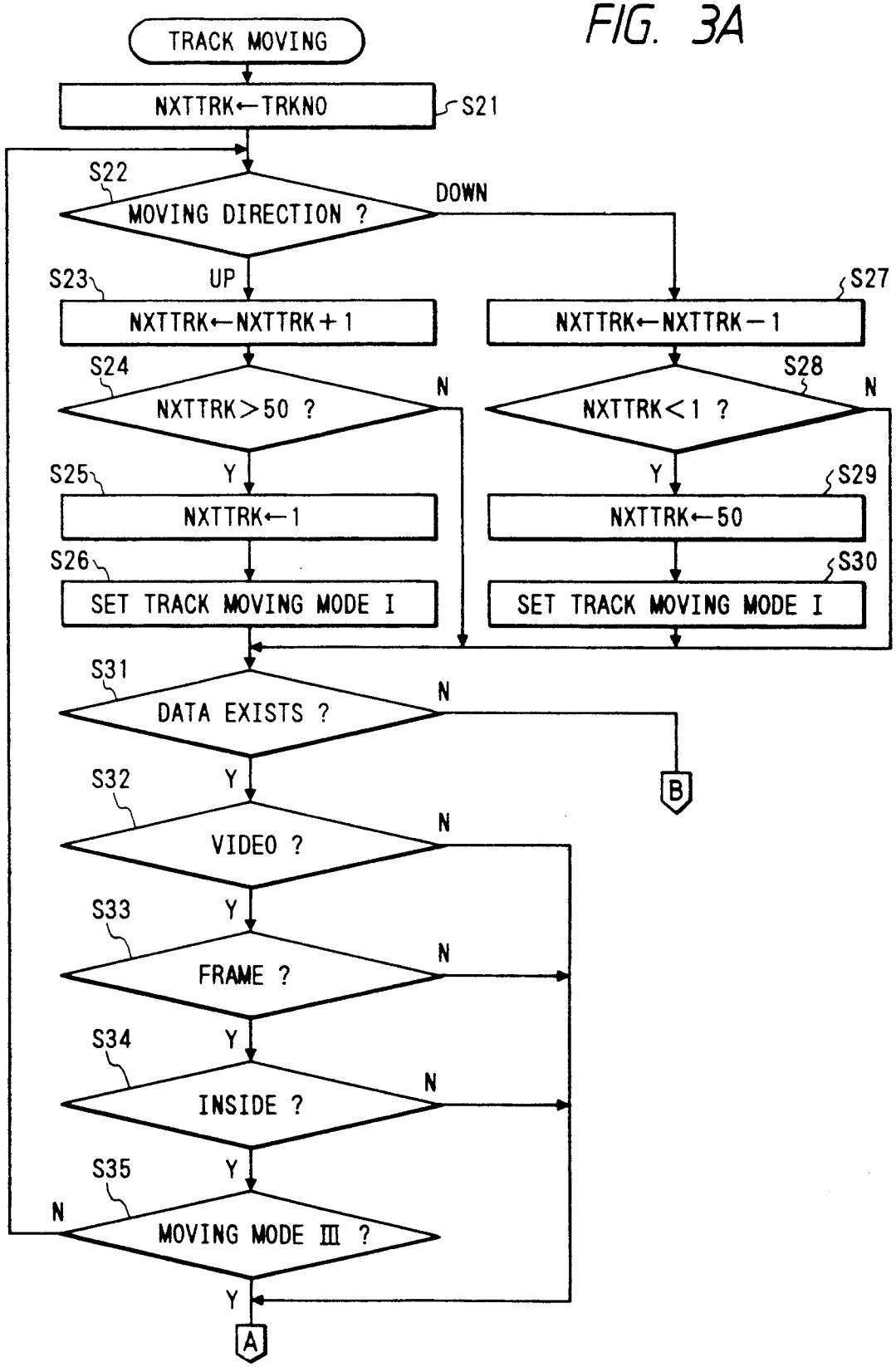
FIGS. 3A to 3D (including FIGS. 3D-1 and 3D-2) are flow charts illustrating control of the movement of the head.
Figure 3B:
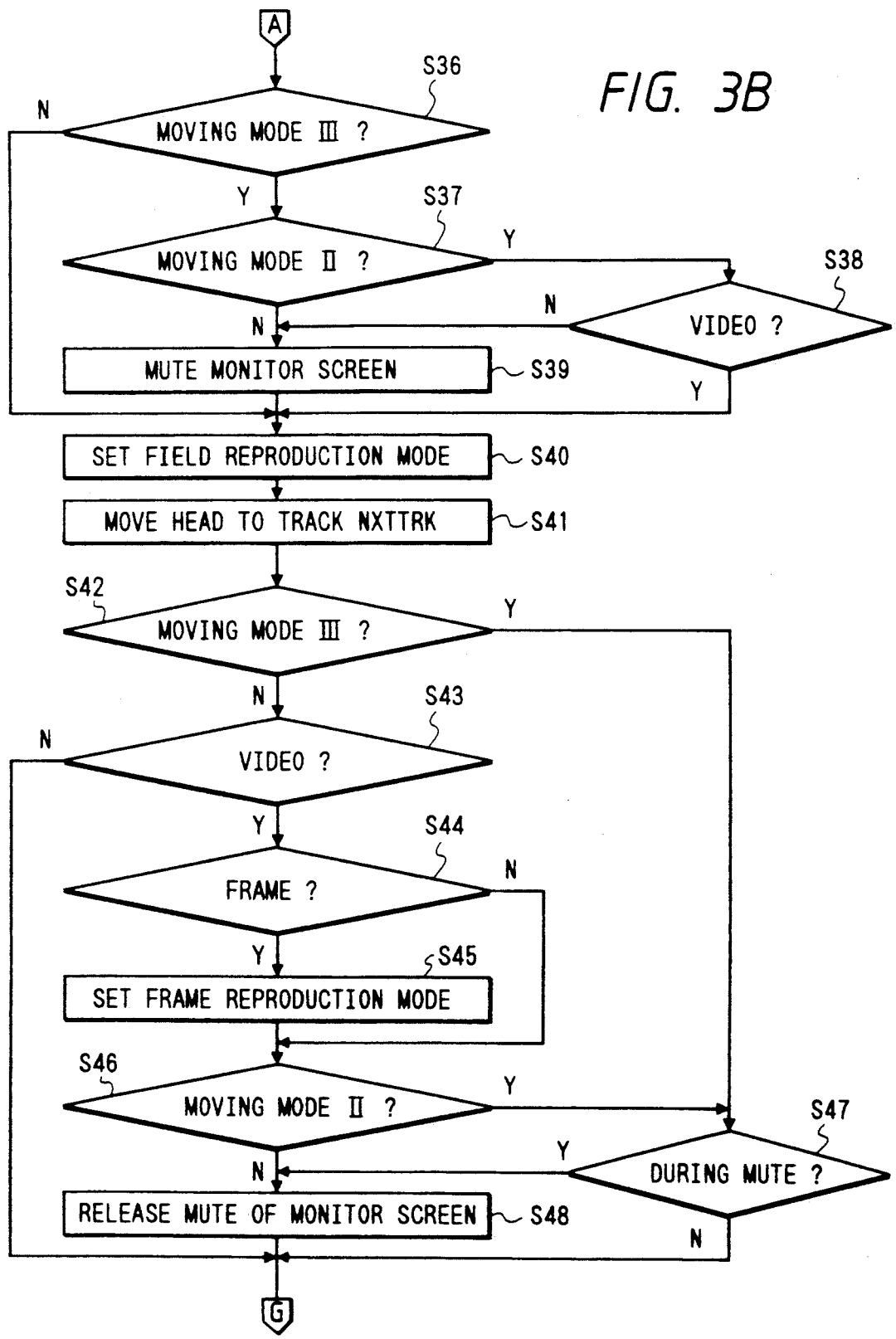
Figure 3C:
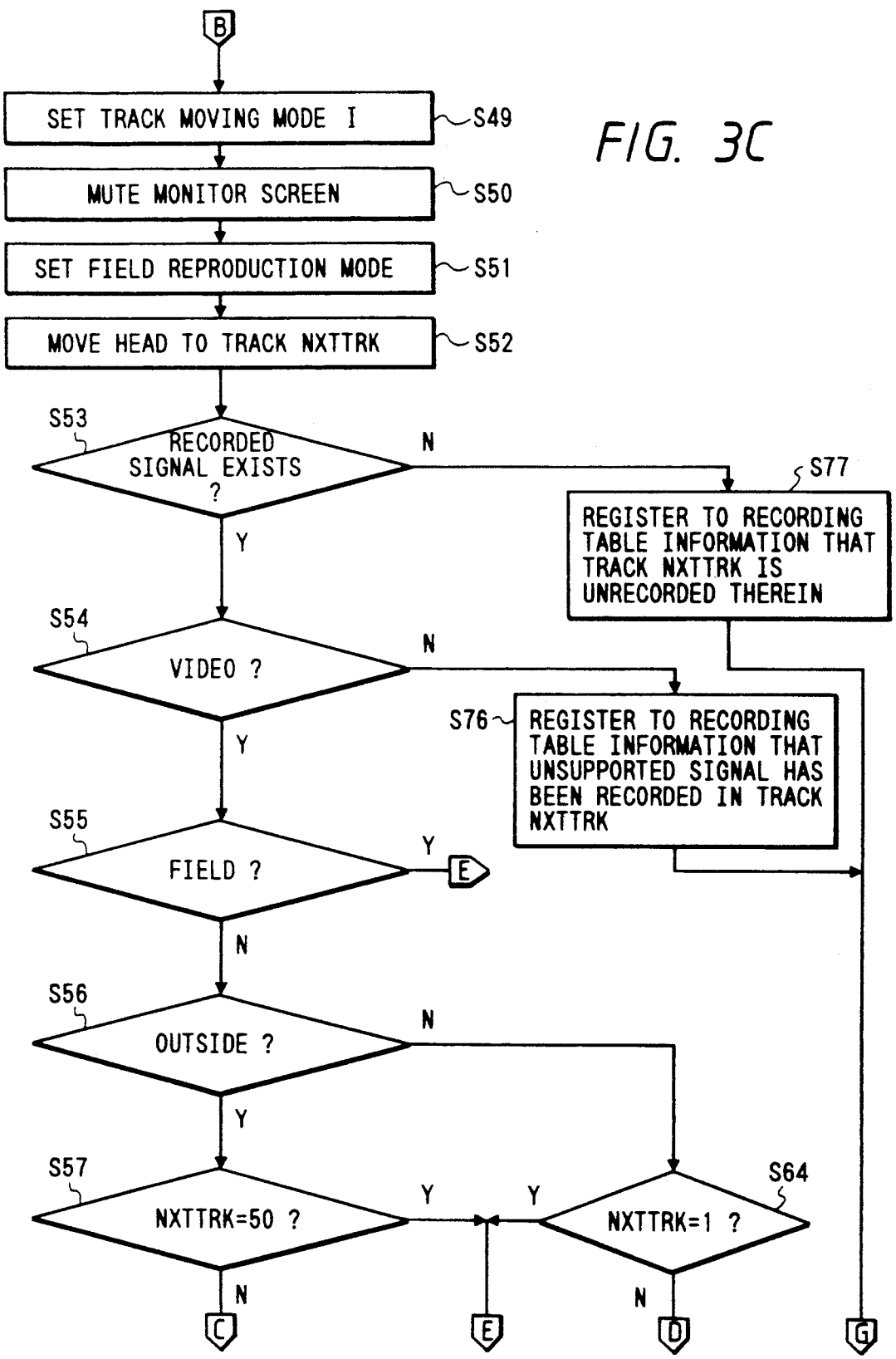
Figures 2, 3D:
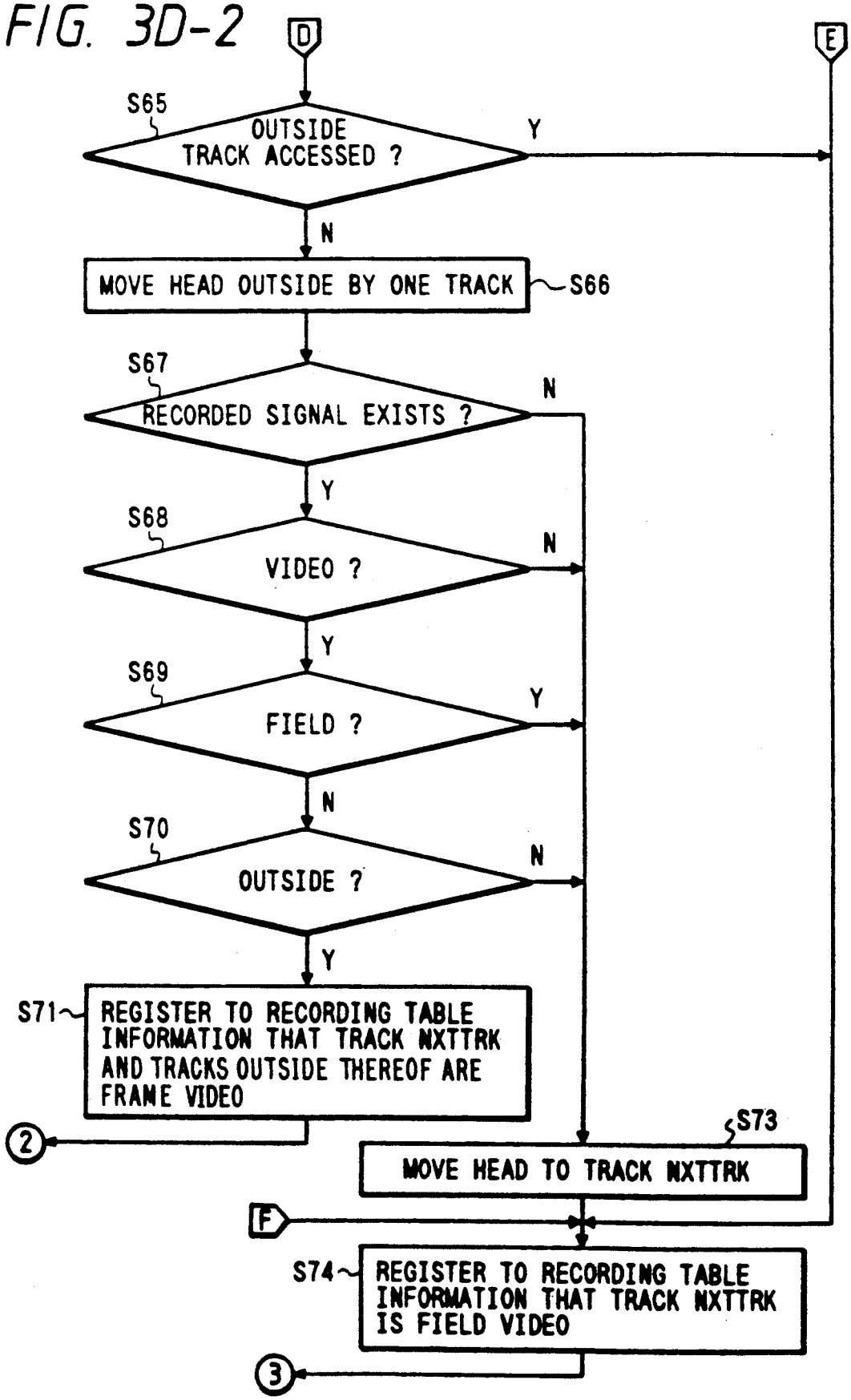

Now, the operation of system controller 22 will be explained with reference to the flow chart of FIGS. 2A and 2B. When the main power source is turned on or when a power "off" state is brought about, system controller 22 initializes various operation flags and mechanisms such as motors (step S1) and mutes the monitor screen (step S2). If magnetic disk 10 (shown as VF in FIGS. 2A and 2B) has already been loaded, a power "on" state is waited for (steps S3 and S8). If magnetic disk 10 is not loaded (step S3), the loading of the disk or a power "on" state is waited for (steps S4 and S5). If the power "on" state is brought about before the disk is loaded, the loading thereof is waited for (step S6). If magnetic disk 10 is loaded prior to the power "on" state, the power "on" state is automatically set up at that instant (step S7).

In the above operation, magnetic disk 10 is loaded, and also the power "on" state is set up. Subsequently, system controller 22 drives motor 12 for rotating magnetic disk 10 (step S9), and when a predetermined revolving rate is reached, power is supplied to the reproduction system to be ready for reproduction (step S10). At this time, all the tracks of magnetic disk 10 are scanned by moving the magnetic head 14, and whether each track is a recorded or unrecorded track is judged from the magnitude of the signal reproduced from it, the result of the judgement being stored in a data table under control of system controller 22 (step S11). This data table is referred to as the recording table. After the data table has been formed with respect to all the tracks of magnetic disk 10, magnetic head 14 is moved to the first track, i.e., the outermost track of magnetic disk 10 (step S12), and an operation request input is waited for (steps S13 and S14). When magnetic disk 10 is ejected or the power "off" state is brought about (FIG. 2A), the program returns to steps S1 or S2, and a loading of magnetic disk 10 or a power "on" state are waited for.

Now, the control operation at the time of movement of magnetic head 14 will be described with respect to FIGS. 3A, 3B, 3C, 3D-1, and 3D-2. Magnetic head 14 actually comprises two magnetic heads so as to be able to reproduce signals from two adjacent tracks without head movement. Of the two magnetic heads, one for reproducing a signal from the outside track is referred to as ch1, and one for reproducing a signal from the inside track is referred to as ch2. In the field reproduction mode only, either ch1 or ch2 is used, and in the frame reproduction mode, both ch1 and ch2 are used.

When system controller 22 detects a track advancing request signal from track advancing request switch 30, it sets number TRKNO of the track being accessed in access counter NXTTRK (step S21). Hereinafter, a track represented by NXTTRK is referred to as track NXTTRK. If the track moving direction signal from track advancing request switch 30 represents the "up" direction (step S22), number NXTTRK is incremented by one (step S23). If number NXTTRK becomes greater than "50" (step S24), "1" is preset as number NXTTRK (step S25), and mode I is set as the track moving mode (step S26). If the track moving direction signal represents the "down" direction (step S22), number NTTRK is decremented by one (step S27). If number NXTTRK becomes less than 1 (step S28), "50" is preset as number NXTTRK (step S29), and mode I is set as the track moving mode (step S30).

Then, a check is performed as to whether data concerning track NXTTRK exists in the recording table noted above (step S31). If the data exists and also if track NXTTRK is the inside track of a frame video signal and the prevailing track moving mode is other than mode III, the routine goes back to step S22 to repeatedly execute step S22 and the following steps (steps S32 to S35).

When an accessed track is determined to be an inside track of a frame video signal, the monitor screen is muted if the track moving mode is mode I or if the track to be accessed next contains a recorded signal other than a video signal (steps S36 to S39). Otherwise, the prevailing state of the monitor screen is continued (bypassing step S39). If the moving mode is mode II, and if the accessed track contains other than a video signal, the monitor screen is muted (steps S37 to S39). After mute control of the monitor screen, the field reproduction mode (in which head ch1 is used) is set (step S40), and head ch1 is moved to track NXTTRK (step S41). After the track moving is ended, in a track moving mode other than mode III (step S42), if a video signal is contained in the accessed track (step S43), frame/field judgement is executed (step S44). In the case of a frame, the frame reproduction mode is set (step S45). The muting of the monitor screen is then released (step S48) except when the muting of the monitor screen is no longer being carried out (step S47) in mode II (step S48). In the case of a signal other than a video signal (step S43), the muting of the monitor screen is continued. In mode III (step S42), the muting of the monitor screen is released (step S48) when and only when the monitor screen is held muted (step S47). If no data of track NXTTRK exists in the recording table (step S31), mode I is set as the track moving mode (step S49), and the monitor screen is muted (step S51). The field reproduction mode using head ch1 is set (step S51), and magnetic head 14 is moved (step S52) to let head ch1 access track NXTTRK (step S52). If the signal reproduced from head ch1 is greater than a predetermined value (step S53), system controller 22 determines that there exists some recorded signal and executes a check as to whether the signal is a video signal by checking whether vertical and horizontal sync signals exist (step S54). If the signal is a video signal, the system controller 22 checks whether an ID signal prescribed in a still video floppy recording format is recorded. If it is recorded, a check is done from field/frame judgement data as to whether field or frame recording is the case (step S55). In the case of the frame mode, a check is done as to whether the prevailing reproduced signal is an inside or an outside signal of the frame (step S56). In the outside case (step S56), if the prevailing track is the innermost track (i.e., track No. 50) (step S57), processing in the case of field video is executed (step S74). If the track is other than track No. 50, the field reproduction mode using head ch2 is set to reproduce the signal in the inside track with head ch2 (step S58). Then, a check is made as to whether the reproduced signal is the inside signal of the frame video signal, in the same procedure as that of steps S53 to S56 (steps S59 to S62). If the reproduced signal is the inside signal of the frame video signal (step S62), it is registered in the recording table that track NXTTRK and tracks inside thereof are frame video signals (step S63).

If the signal reproduced by head ch1 is the inside signal of the frame video signal (step S56), processing in the case of field video is executed (step S74) if the track being accessed by head ch1 is track No. 1 (step S64). If the track is other than track No. 1, a check is made as to whether information concerning this track has already been registered in the recording table (step S65). If the information has been registered, head ch1 is moved outside by one track (step S66). A check is made as to whether a signal in a track one track outside the regular access track and reproduced by head ch1 is the outside signal of the frame video signal is executed in the same procedure as that of steps S53 to S56 (steps S67 to S69). If the signal is not the outside signal of the frame video signal (step S70), magnetic head 14 is moved to let track NXTTRK be accessed by head ch1 again (step S73), information that track NXTTRK is field video is registered in the recording table, and the field reproduction mode using head ch1 is set (step S74).

If the signal is the outside signal of frame video (step S70), information that track NXTTRK and tracks outside thereof are of frame video is registered in the recording table (step S71). If this information is registered, the frame reproduction mode using both heads ch1 and ch2 is set (step S72).

If it is determined in step S5 that the track is an unrecorded track, information that track NXTTRK is an unrecorded track is registered in the recording table (step S77). If it is determined in step S54 that the reproduced signal is other than a video signal, information that an unsupported signal has been recorded in track NXTTRK is registered in the recording table (step S76), and track moving is ended with the monitor screen held muted.

If it is determined in step S54 that the signal is a video signal, the muting of the monitor screen is released (step S75), and track moving is ended.

Now, track moving mode switching control timing will be described with reference to FIG. 4. As described before, counter 36 normally up-counts pulses output from reference pulse generator 34. Referring to FIG. 4, when a track advancing request pulse is generated at instant t1, the outputs of D flip-flops 54 and 56 are reset at this instant, and counter 36 is also reset (see reset signal output from controller 22 in FIG. 1). When a track advancing request pulse is generated at subsequent instant t2, a number obtained as a result of counting in counter 36 from instant t1 to instant t2 is latched in counter register 32. The value latched in counter register 32 is impressed on comparators 38 and 40. Comparator 38 compares the impressed input to a reference value from switch 42, while comparator 40 compares the impressed input to a reference value from switch 44. These comparators output a signal H if the impressed input is less than the reference value. The outputs of comparators 38 and 40 are latched in D flip-flops 54 and 56 under control of a track advancing request pulse having been delayed in delay circuit 58. System controller 22 determines a moving mode as noted before according to the outputs of D flip-flops 54 and 56. The delayed track advancing request pulse from delay circuit 58 is supplied as a reset pulse to counter 36. From this instant, counter 36 starts the counting of reference pulses again.

Figure 5:
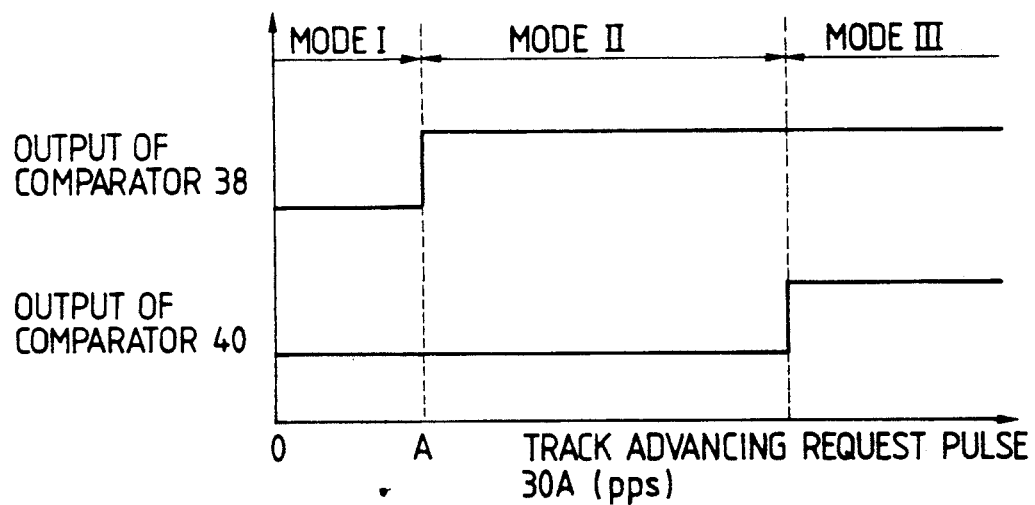
FIGS. 5 to 8 are diagrams for explaining the switching of the head-moving modes.
Figure 6:
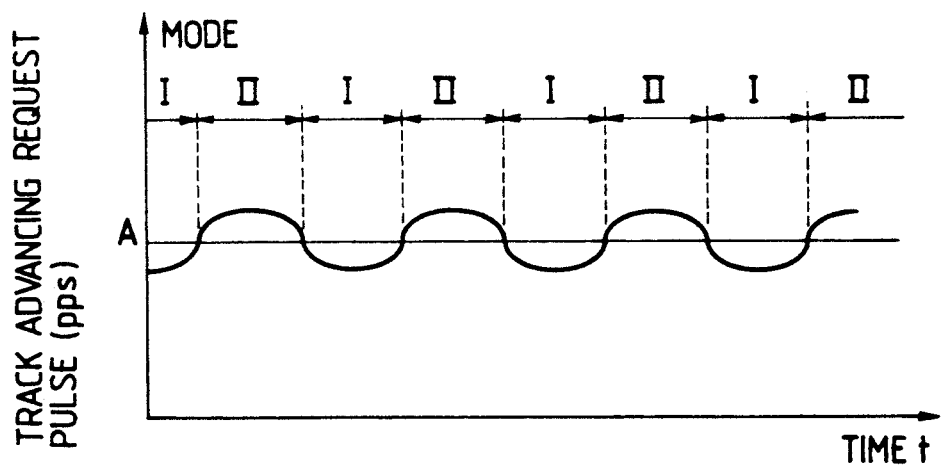

Now, a case is considered in which system controller 22 changes the moving mode as shown in FIG. 5. In the case when the track advancing request pulse signal is varying in the neighborhood of point A, modes I and II are provided alternately as the moving mode with point A as the borderline. When viewed by the operator, track moving with and without muting the monitor screen are provided in a mixed fashion for every track moving operation, which is visually very inconvenient.

Figure 7:
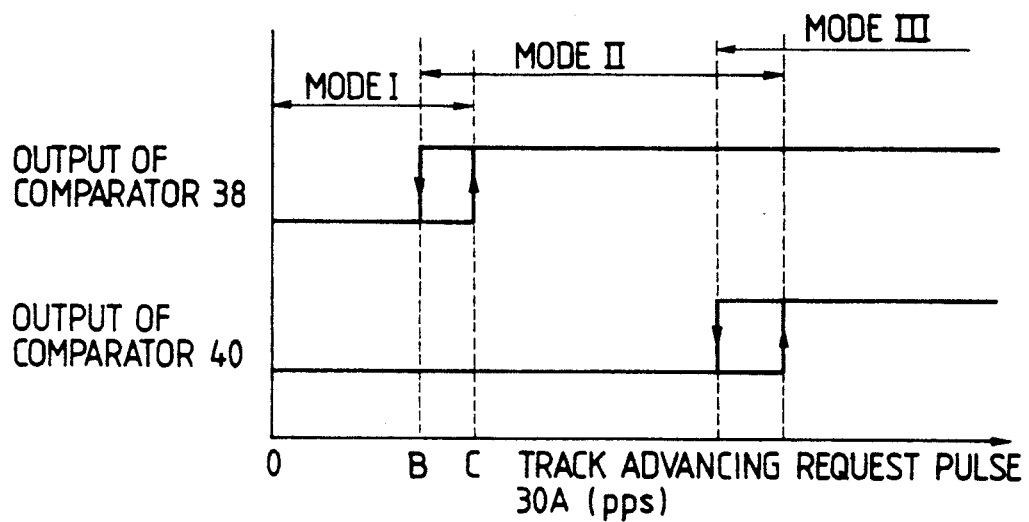
Figure 8:
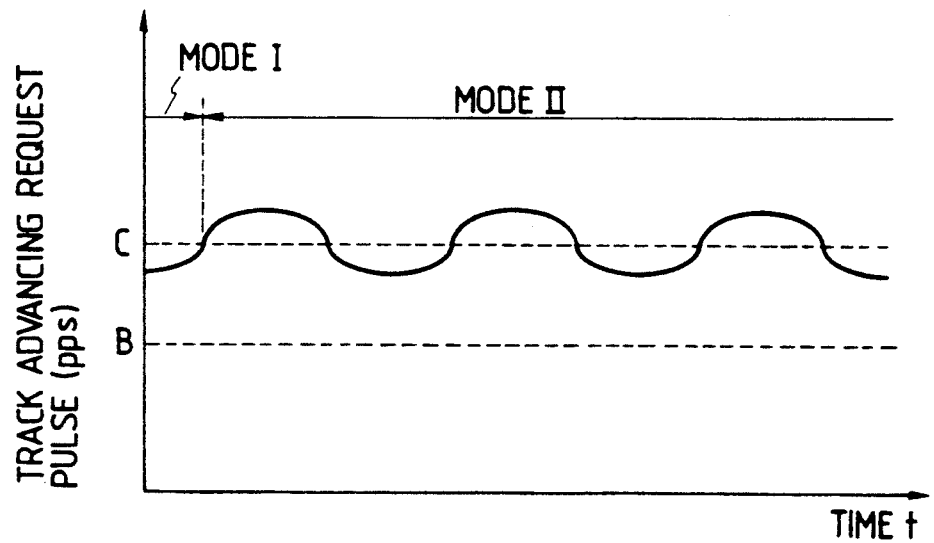

Accordingly, as shown in FIG. 7, a hysteresis is provided in the neighborhood of the switching point of the moving modes, for instance point C in the case of switching from mode I to mode II, and point B in the case of switching from mode II to mode I. By so doing, either moving mode, i.e., either mode I or II, is provided fixedly except for the case in which the moving range contains both points B and C. This is realized by controlling switches 42 and 44 according to the outputs of D flip-flops 54 and 56, switching memories 46 and 48 with respect to the reference value of comparator 38, and switching memories 50 and 52 with respect to the reference value of comparator 40.

Figure 9:
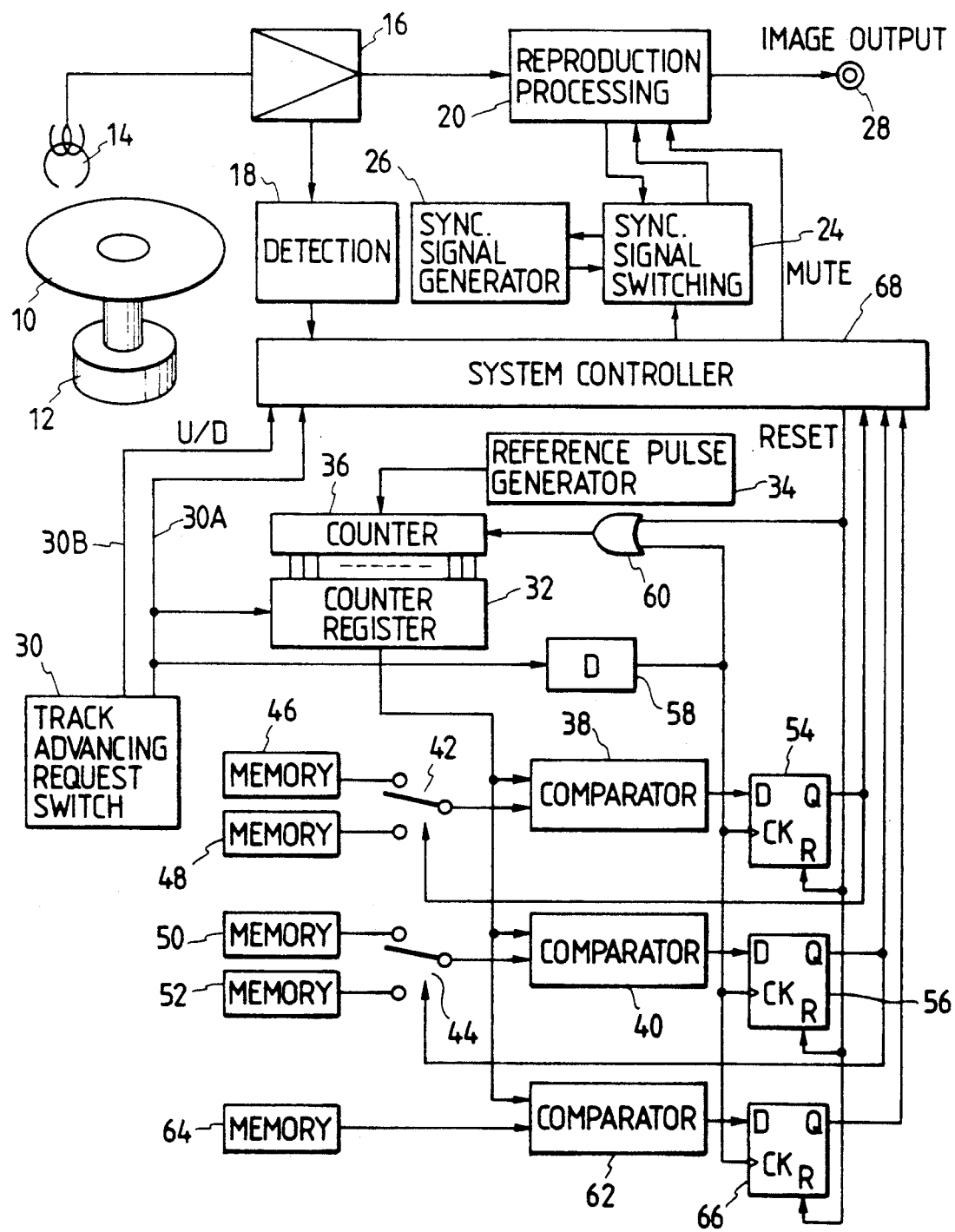
FIG. 9 is a block diagram representing modifications of the FIG. 1 embodiment.

FIG. 9 is a block diagram representation of a second embodiment. Elements like those in FIG. 1 are designated by like reference numerals. That is, magnetic disk 10, magnetic head 14, amplifier 16, detector 18, reproduction processing circuit 20, sync signal switch 24, and sync signal generator 26 are like those in FIG. 1, and also the function and structure of track advancing request switch 30 are the same as in the case of FIG. 1.

In the embodiment of FIG. 9, comparator 62, (which compares the value latched in counter register 32, i.e., a value indicative of the pulse interval of the track advancing request pulse signal 30A, to a predetermined value), and memory 64 (for providing the predetermined value noted above) are provided additionally. Further, D flip-flop 66 is provided additionally, in which the output of comparator 62 is latched according to the track advancing request pulse having been delayed in delay circuit 58. System controller 68 thus determines the overall operation according to the outputs of D flip-flops 54, 56 and 66. In other words, system controller 68 selectively executes the following moving mode IV in addition to modes I to III in the case of system controller 22.

Moving Mode IV

While a track advancing request pulse prevails, track moving is executed in the same state as mode III. The speed of moving is set to the maximum speed determined by mechanical factors.

When the output of D flip-flop 66 is "L", system controller 68 selectively executes modes I to III according to the outputs of D flip-flops 54 and 56 as in the case of the embodiment of FIG. 1. The operation in the case of mode IV will be described with reference to FIGS. 10 and 11. FIG. 10 is an internal functional block diagram of system controller 68 corresponding to mode IV.

When the value registered in counter register 32 becomes smaller than the value stored in memory 64, that is, when the track advancing request pulse demands quicker track moving than a predetermined maximum speed, comparator 62 provides output "H", and D flip-flop 66 provides output "H". Controller 70 switches switch 72 such that the track advancing request pulse 30A is input to track position counter 74 while the output of D flip-flop 66 is "L". When controller 70 detects that the output of D flip-flop 66 has become "H", it switches switch 72 to the side of timer 78 to let the output pulse thereof be input to track position counter 74. Timer 78 is set to a time corresponding to the predetermined maximum speed of track moving and outputs a pulse whenever that time has passed.

When controller 70 detects up- or down- counting of track position counter 74 according to the input pulse, it instructs track moving controller 76 to move magnetic head 14 to a track position indicated by track position counter 74, and track moving controller 76 causes motor 80 to move magnetic head 14. When the head is moved to the track indicated by track position counter 74, controller 70 switches switch 72 to the side of track moving request pulse 30A to operate timer 78 once. If the track being accessed is an unrecorded track or contains a recorded signal other than video when time-out of timer 78 occurs, controller 70 mutes the monitor screen. If the track being accessed contains a recorded video signal, the controller executes field/frame judgement and reproduces the video signal according to the result of that judgement.

As a modification of the embodiment of FIG. 9, moving mode IV may be modified as follows.

Moving Mode IV

While a track advancing request pulse prevails, the monitor screen is held muted, and up- or down- counting of the track position counter under control of system controller 68 is caused according to track moving direction signal 30B from track moving request switch 30 without causing track moving. At the instant at which the mode is over, i.e., at which the output of D flip-flop 66 is changed to "L", magnetic head 14 is moved to the track position indicated by the track position counter.

FIG. 11 is an internal functional block diagram of system controller 68 in mode IV. When controller 82 detects that the output of D flip-flop 66 has become "H", reproduction processing circuit 20 provides a mute signal commanding the muting of the image signal output. It also instructs track moving controller 86 to step the head. Track position counter 84 executes up- or down-counting according to track moving direction signal 30B every time track moving request pulse 30A is input even while the head is stationary. Controller 82 continuously monitors the output of D flip-flop 66, and when it detects that the output of D flip-flop 66 has become "L", it instructs track moving controller 86 to move magnetic head 14 to a track shown by track position counter 84. In the case when track moving request pulse 30A prevails at the instant of the end of moving the magnetic head 14, the controller 82 moves the head according to the moving mode selected according to the outputs of D flip- flops 54, 56 and 66. When track moving request pulse 30A is not input for a predetermined period of time so that controller 82 confirms the end of track advancing, it mutes the monitor screen if the track being accessed is an unrecorded track or contains a recorded signal other than video. If the track being accessed contains a recorded video signal, it executes field/frame judgement and causes reproduction according to the result of the judgement.

As has been shown, in this embodiment a plurality of different track moving modes are provided, and it is possible to process push switch and rotary encoder inputs with the same circuitry by switching the moving mode continuously according to the rate of the input track moving request pulse. In addition, with the hysteresis characteristic provided for a point of track moving mode switching, changes in the moving mode may be minimized even when the input track moving request pulse is varying in the neighborhood of the point of track moving mode switching.

The above embodiments have concerned a magnetic disk, but it is possible to use an optical disk or tape-like recording medium as well.

As has been made apparent from the foregoing, according to the invention, one of a plurality of different operation modes is selected according to a signal from track moving request means, and thus it is possible to obtain sophisticated control of the reproduction screen with a simple operation.

What is claimed is:

1. A still image reproducing system comprising:
   a) reproducing means for reproducing still image data recorded on a recording medium;
   b) instructing means for issuing instructions to cause movement of a reproducing position of said reproducing means;

c) means for measuring a time interval between the instructions issued by said instructing means; and d) control means for selecting one of a plurality of operation modes of said reproducing means according to the time interval measured by said measuring means, said operation modes comprising a first mode in which still image data reproduced by said reproducing means is muted, and a second mode in which still image data reproduced by said reproducing means is not muted.

2. The still image reproducing system according to claim 1, wherein said recording medium comprises a disk-like medium.

3. The still image reproducing system according to claim 1, wherein said recording medium comprises a magnetic recording medium.

4. The still image reproducing system according to claim 1, wherein instructing means comprises a jog dial.

5. The still image reproducing system according to claim 1, wherein said measuring means includes:

A) a counter for counting a clock signal; and

B) means for altering the count of said counter according to an instruction of said instructing means.

6. The still image reproducing system according to claim 1, wherein in said first mode said control means causes the still image data reproduced by said reproducing means to be muted while said reproduction position is being changed, and wherein in said second mode said control means causes the still image data reproduced by said reproducing means to be not muted even while said reproducing position is being changed.

7. The still image reproducing system according to claim 6, wherein said control means selects said second mode if said interval is comparatively short and selects said first mode if said interval is comparatively long.

8. Control apparatus for a reproducing system having a reproducing head, comprising:

a) track moving request means for issuing request signals to cause a movement of the reproducing head to a desired track position;

b) measuring means for measuring a time interval between request signals issued by said track moving request means; and c) control means for selectively executing one of a plurality of different operation modes according to the time interval measured by said measuring means, said operation modes comprising a first mode in which an output of the reproducing head is caused to be muted, and a second mode in which the output of the reproducing head is not muted.

9. The control apparatus according to claim 8, wherein said track moving request means issues request signals to cause the reproducing head to move over a plurality of tracks which comprise a plurality of concentric circles.

10. The control apparatus according to claim 8, wherein said request means comprises a jog dial.

* * * * *

UNITED STATES PATENT AND TRADEMARK OFFICE
CERTIFICATE OF CORRECTION

PATENT NO. : 5,179,480
DATED : January 12, 1993
INVENTOR(S) : TAKAHASHI

It is certified that error appears in the above-indentified patent and that said Letters Patent is hereby corrected as shown below:

COLUMN 6

Line 7, "step S5" should read --step S53--.

Signed and Sealed this

First Day of February, 1994

Attest:

BRUCE LEHMAN

Attesting Officer

Commissioner of Patents and Trademarks